(12) United States Patent
Soltani et al.

(10) Patent No.: US 8,840,822 B2
(45) Date of Patent: Sep. 23, 2014

(54) METHOD OF MANUFACTURING MOLDED ARTICLE INCLUDING COMPONENT INSERT-MOLDED IN MOLDING MATERIAL MIXED WITH SOLID POWDER

(75) Inventors: Bahman Hossini Soltani, Anjo (JP); Hiroaki Mizuno, Kariya (JP); Motohiro Ishibashi, Anjo (JP); Sadamu Shiotsuki, Nishio (JP)

(73) Assignee: Denso Corporation, Kariya (JP)

( * ) Notice: Subject to any disclaimer, the term of this patent is extended or adjusted under 35 U.S.C. 154(b) by 204 days.

(21) Appl. No.: 13/566,567

(22) Filed: Aug. 3, 2012

(65) Prior Publication Data

US 2013/0032966 A1   Feb. 7, 2013

(30) Foreign Application Priority Data

Aug. 3, 2011 (JP) ................................. 2011-169807

(51) Int. Cl.
  *B29C 39/10* (2006.01)
(52) U.S. Cl.
  CPC ..................................... *B29C 39/10* (2013.01)
  USPC ......................... 264/69; 264/112; 264/272.19
(58) Field of Classification Search
  None
  See application file for complete search history.

(56) References Cited

U.S. PATENT DOCUMENTS

| 4,243,623 | A * | 1/1981 | Sprengling et al. ............. 264/69 |
| 6,103,157 | A * | 8/2000 | Behm et al. .................... 264/102 |
| 2012/0154088 | A1 | 6/2012 | Soltani et al. |
| 2013/0032964 | A1 * | 2/2013 | Soltani et al. ................... 264/71 |

FOREIGN PATENT DOCUMENTS

| JP | 43-029778 | 12/1968 |
| JP | 48-059364 | 8/1973 |
| JP | 8-11994 | 1/1996 |
| JP | 2007-136714 | 6/2007 |
| JP | 2007-136805 | 6/2007 |
| JP | 2010-212632 | 9/2010 |
| JP | 2011-168026 | 9/2011 |

OTHER PUBLICATIONS

U.S. Appl. No. 13/327,814, filed Dec. 16, 2011, Soltani et al.
Office Action (2 pages) dated Jun. 4, 2013 issued in corresponding Japanese Application No. 2011-169807 and English translation (3 pages).

* cited by examiner

*Primary Examiner* — Mary F Theisen
(74) *Attorney, Agent, or Firm* — Nixon & Vanderhye PC

(57) ABSTRACT

The method of manufacturing a molded article including a component insert-molded in a molding material mixed with solid powder includes an injecting step of injecting the molding material and the solid powder into a molding die, an agitating step of agitating the molding material and the solid powder within the molding die to disperse the solid powder in the molding material, and an embedding step of pressing and embedding the component into an agitated mixture of the molding material and the solid powder.

19 Claims, 12 Drawing Sheets ized casting material into a casting die from
METHOD OF MANUFACTURING MOLDED ARTICLE INCLUDING COMPONENT INSERT-MOLDED IN MOLDING MATERIAL MIXED WITH SOLID POWDER This application claims priority to Japanese Patent Application No. 2011-169807 filed on Aug. 3, 2011, the entire contents of which are hereby incorporated by reference.

BACKGROUND OF THE INVENTION

1. Field of the Invention

The present invention relates to a method of manufacturing a molded article including a component insert-molded in a molding material mixed with solid powder.

2. Description of Related Art

Japanese Patent Application Laid-open No. 2007-136805 describes a method of manufacturing such a molded article.

In this method, a molded article is manufactured by agitating a casting material injected into a casting material cup, and injecting the agitated casting material into a casting die from the casting material cup. When the casting material is a molding material to be mixed with solid powder, the molding material and the solid powder mixed at a predetermined mixing ratio is injected into the casting material cup, and agitated so that the solid powder is dispersed in the molding material. Thereafter, the agitated mixture of the molding material and the solid powder is injected into the casting die from the casting material cup to mold a molded article.

However, the above method has a problem in that since the solid powder precipitates in the casting material cup, the mixing ratio of the solid powder deviates from die-to-die. Further, when the mixing ratio of the solid powder is high, since the viscosity of the agitated mixture of the molding material and the solid powder is high, it becomes difficult to inject the agitated mixture into the casting die from the casting material cup, causing the working hours to be lengthened. In addition, when the viscosity is higher, since the agitated mixture adheres more to the surface of the casting material cup, an amount of the agitate mixture which resides in the casting material cup and not injected into the casting die increases, as a result of which the yield ratio decreases.

SUMMARY

An exemplary embodiment provides a method of manufacturing a molded article including a component insert-molded in a molding material mixed with solid powder including:

an injecting step of injecting the molding material and the solid powder into a molding die;

an agitating step of agitating the molding material and the solid powder within the molding die to disperse the solid powder in the molding material; and an embedding step of pressing and embedding the component into an agitated mixture of the molding material and the solid powder.

According to the exemplary embodiment, there is provided a method of manufacturing a molded article including a component insert-molded in a molding material mixed with solid powder, capable of suppressing article-to-article variation of the mixing ratio of the solid powder and efficiently insert-molding the component in the molding material mixed with the solid powder.

Other advantages and features of the invention will become apparent from the following description including the drawings and claims.

PREFERRED EMBODIMENTS OF THE INVENTION

The present invention will be described by way of embodiments for manufacturing reactors for use in a motor control apparatus which controls a vehicle-driving motor.

First Embodiment

First, the structure of a reactor 1 manufactured by the method according to the first embodiment of the invention is explained with reference to FIGS. 1 and 2.

Figure 1:
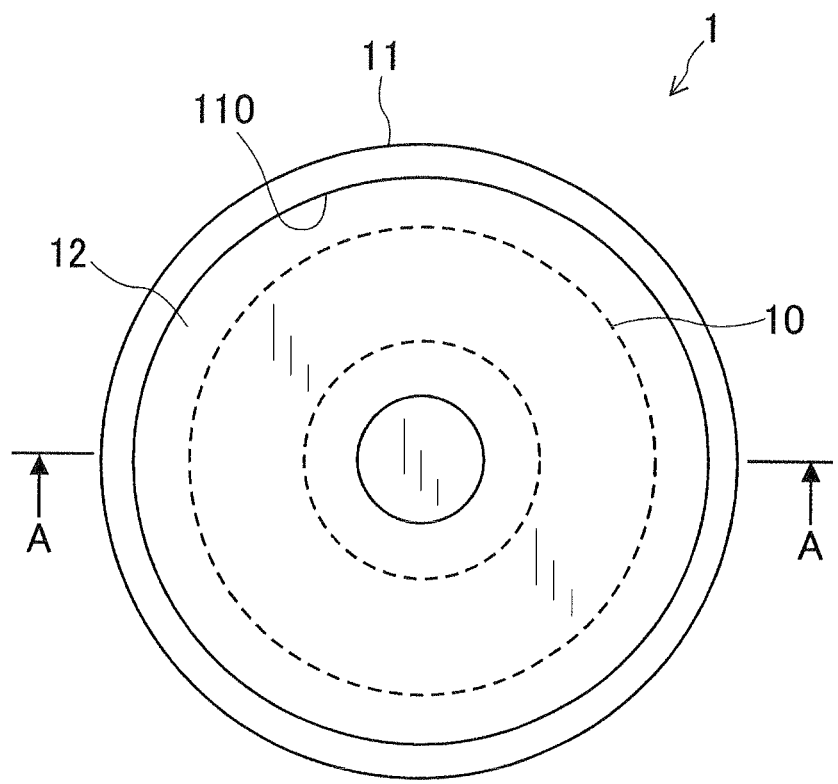
FIG. 1 is a top view of a reactor manufactured by a method according a first embodiment of the invention.
Figure 2:
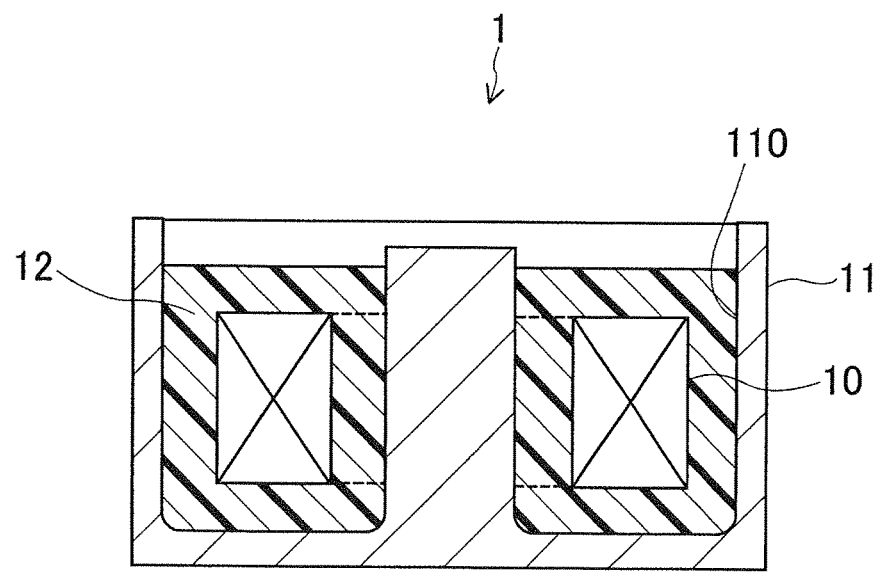
FIG. 2 is a cross-sectional view of FIG. 1 taken along line A-A.

FIG. 1 is a top view of the reactor 1. FIG. 2 is a cross-sectional view of FIG. 1 taken along line A-A. In FIGS. 1 and 2, terminals of a coil 10 of the reactor 1 are omitted from illustration.

The reactor 1 as a molded article is a device for use in a motor control apparatus mounted on a vehicle for controlling a vehicle-driving motor. The reactor 1 includes the coil 10 as a component, and a case 11.

The coil 10 is a circular-ring shaped component formed by winding a copper wire coated with insulating material on its surface. The case 11 is a columnar member made of aluminum for housing the coil 10. The case 11 is formed with a circular groove 110. The coil 10 is disposed inside the groove 110 to be molded inside a thermosetting resin 12 mixed with iron powder. The case 11 is fixed integrally to the coil 10 through the thermosetting resin 12.

Next, a method of manufacturing the reactor 1 as a first embodiment of the invention is explained with reference to FIGS. 3 to 10.

Figure 3:
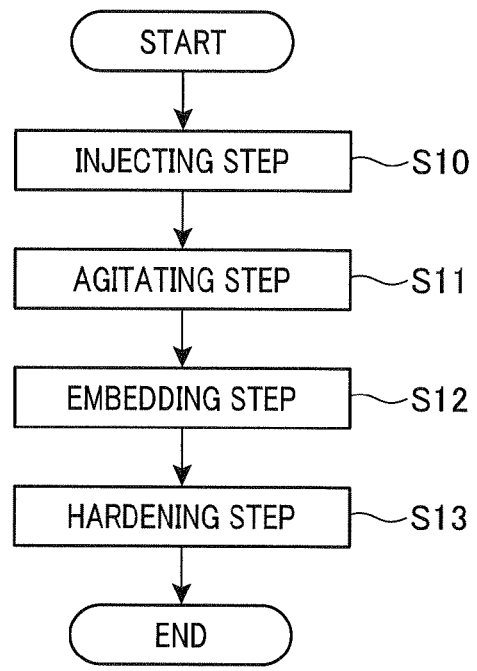
FIG. 3 is a flowchart showing steps included in the method according to the first embodiment carried out for manufacturing the reactor.
Figure 4:
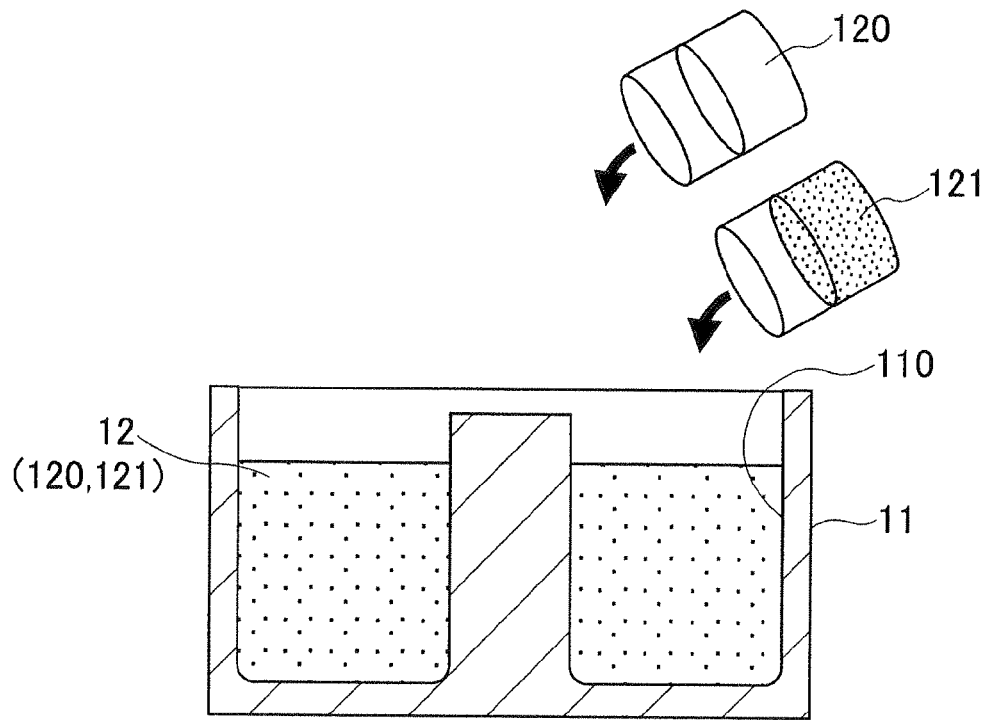
FIG. 4 is an explanatory view explaining an injecting step (FIG. 3) included in the method according the first embodiment.
Figure 5:
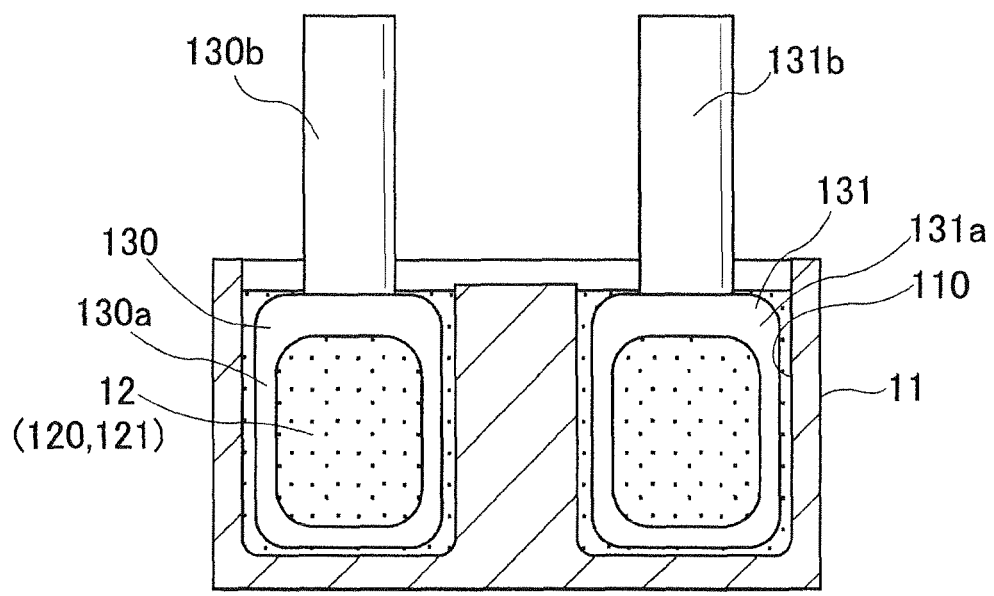
FIG. 5 is an explanatory view explaining an agitating step (FIG. 3) included in the method according the first embodiment.
Figure 6:
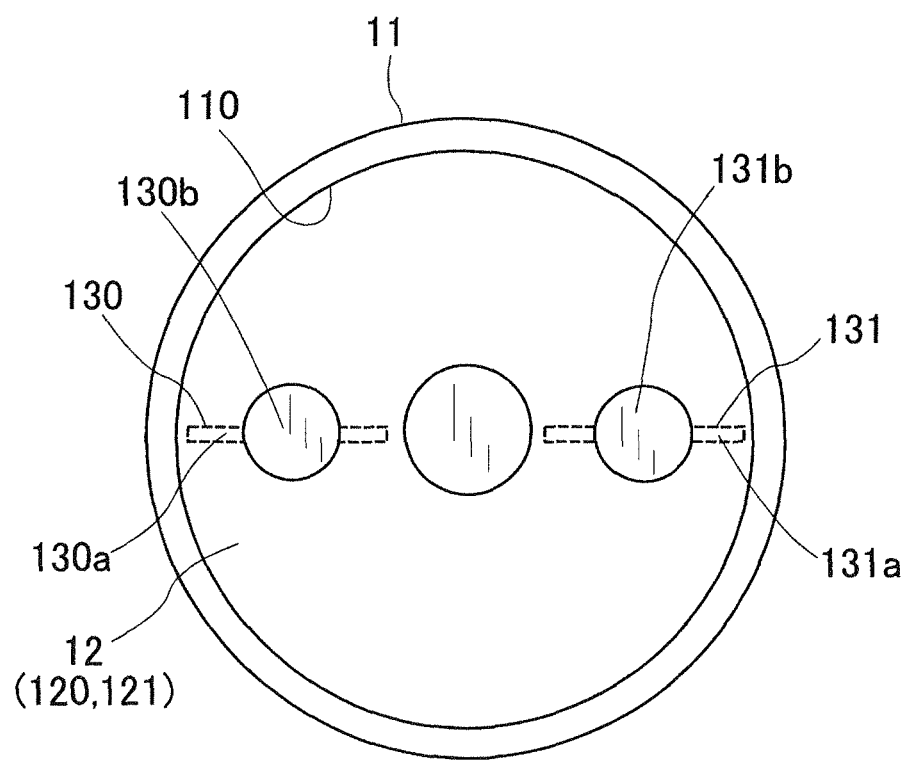
FIG. 6 is another explanatory view explaining the agitating step (FIG. 3) included in the method according the first embodiment.
Figure 7:
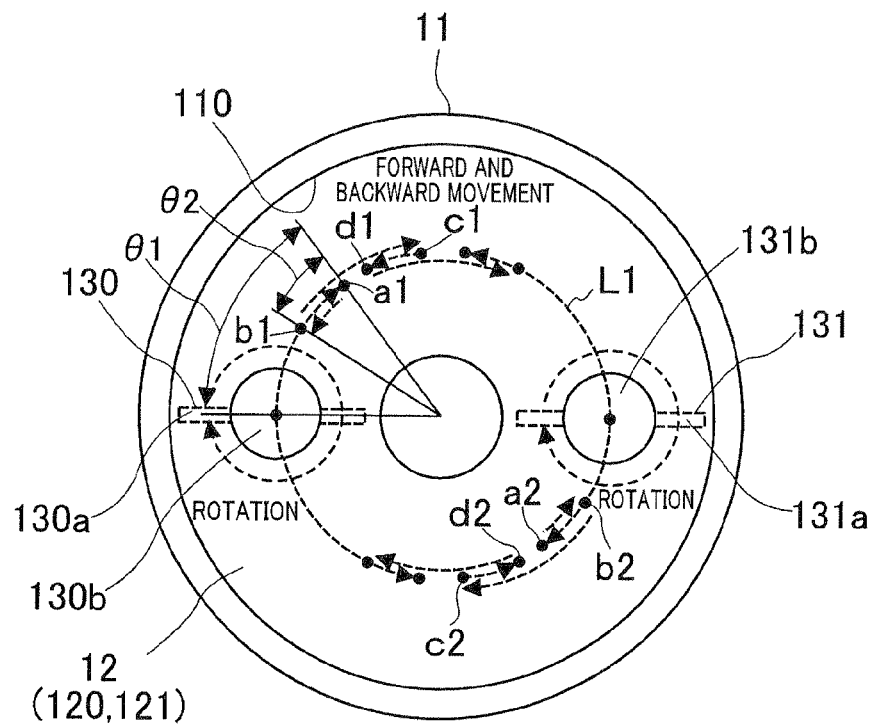
FIG. 7 is an explanatory view explaining a way to move agitating blades in the agitating step.
Figure 8:
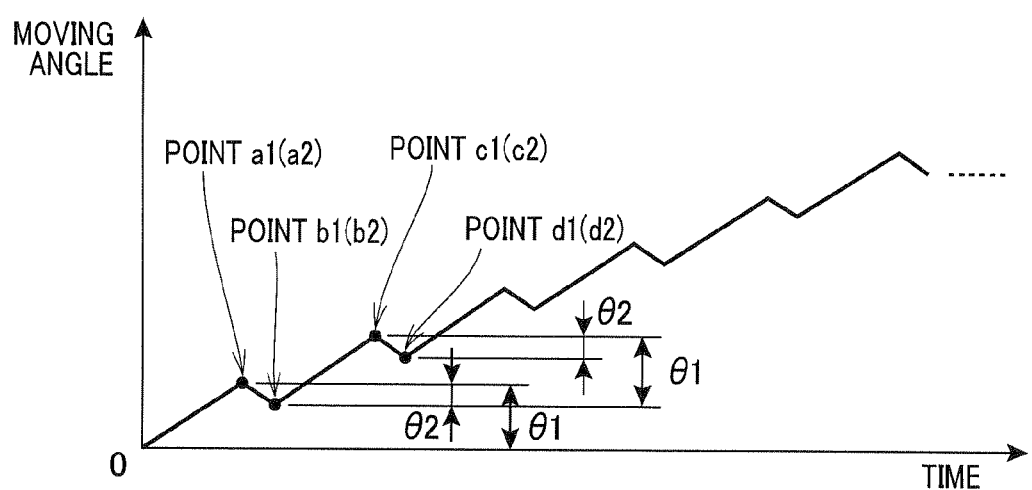
FIG. 8 is a graph explaining the way to move the agitating blades in the agitating step.
Figure 9:
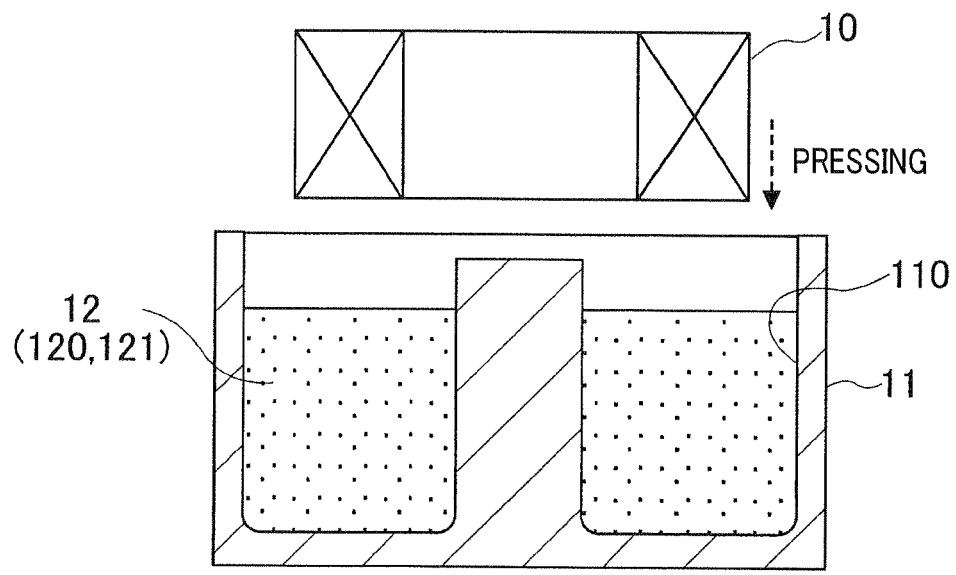
FIG. 9 is an explanatory view explaining an embedding step (FIG. 3) included in the method according the first embodiment.
Figure 10:
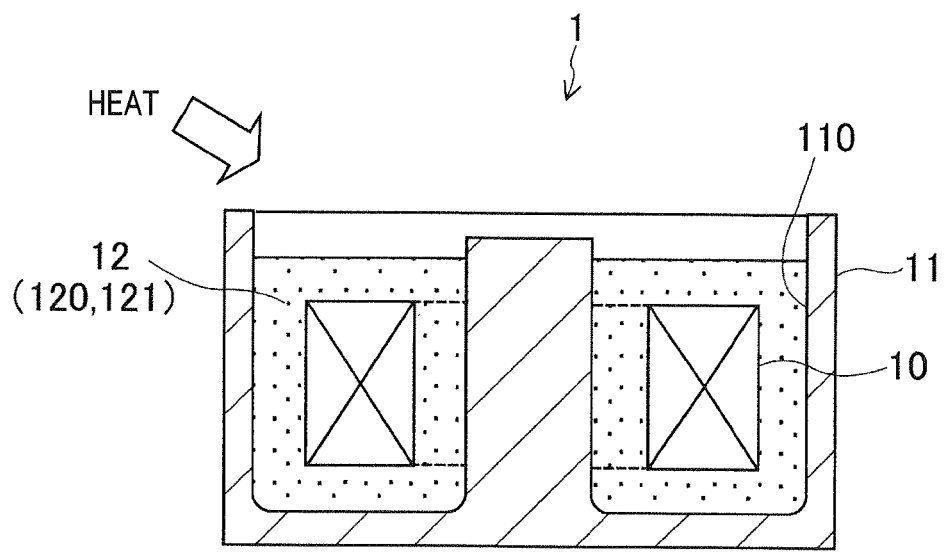
FIG. 10 is an explanatory view explaining a hardening step (FIG. 3) included in the method according the first embodiment.

FIG. 3 is a flowchart showing steps included in the method of manufacturing the reactor 1. FIG. 4 is an explanatory view explaining an injecting step included in the method according the first embodiment. FIG. 5 is an explanatory view explaining an agitating step included in the method according the first embodiment. FIG. 6 is another explanatory view explaining the agitating step included in the method according the first embodiment. FIG. 7 is an explanatory view explaining a way to move the agitating blades in the agitating step. FIG. 8 is a graph explaining the way to move the agitating blades in the agitating step. FIG. 9 is an explanatory view explaining an embedding step included in the method according the first embodiment. FIG. 10 is an explanatory view explaining a hardening step included in the method according the first embodiment. In FIGS. 4 to 9, terminals of the coil 10 of the reactor 1 are omitted from illustration.

As shown in the flowchart of FIG. 3, the method of manufacturing the reactor 1 includes the injecting step S10, the agitating step S11, the embedding step S12 and the hardening step S13.

The injecting step S10 is a step for injecting a thermosetting resin 120 as a molding material and iron powder 121 as a solid magnetic powder into the case 11 which serves also as a molding die. More specifically, the thermosetting resin 120 and the iron powder 121 weighed to a predetermined mixing ratio are injected into the groove 110 as shown in FIG. 4.

The agitating step S11 is a step for agitating the thermosetting resin 120 and the iron powder 121 within the case 11 as a molding die so that the iron powder 121 is dispersed in the thermosetting resin 120 as a molding material. More specifically, as shown in FIGS. 5 and 6, two agitating blades 130 and 131 are disposed so as to be opposed to each other by 180 degrees inside the groove 110 into which the thermosetting resin 120 and the iron powder 121 have been injected. The agitating blade 130 includes a blade section 130a and a shaft section 130b. The agitating blade 131 includes a blade section 131a and a shaft section 131b. The blade sections 130a and 130b have a rectangular plate shape, and rotate independently. The blade sections 130a and 130b are fixed to the shaft sections 130b and 131b, respectively. Each of the blade sections 130a and 130b is made of a metal plate, and has a width slightly smaller than that of the groove 110. Each of the blade sections 130a and 130b is formed with a nearly rectangular hole.

As shown in FIG. 7, the agitating blades 130 and 131 are traveled along a circular path L1 while being moved forward and backward repeatedly with their blade sections 130a and 130b being rotated. More specifically, as shown in FIGS. 7 and 8, the agitating blade 130 is moved forward along the circular path L1 by an angle of $\theta 1$ to reach a point a1, and then moved backward by an angle of $\theta 2$ ($<\theta 1$) to reach a point b1, while on the other hand the agitating blade 131 is moved forward along the circular path L1 by the angle of $\theta 1$ to reach a point a2, and then moved backward by the angle of $\theta 2$ to reach a point b2. Thereafter, the agitating blade 130 is moved forward along the circular path L1 by the angle of $\theta 1$ to reach a point C1, and then moved backward by the angle of $\theta 2$ to reach a point d1, while on the other hand the agitating blade 131 is moved forward along the circular path L1 by the angle of $\theta 1$ to reach a point c2, and then moved backward by the angle of $\theta 2$ to reach a point d2. The above movements are repeated. During the agitating step S11, the viscosity of the mixture of thermosetting resin 120 and the iron powder 121 is measured based on the load torque of the agitating blades 130 and 131. The way to move the agitating blades 130 and 131 is changed in accordance with the measured viscosity. More specifically, the ratio between the stroke or time period of the forward movement and the stroke of the backward movement is changed in accordance with the measured viscosity. By the above described agitating step, the iron powder 121 is dispersed in the thermosetting resin 120.

The embedding step S12 is a step for pressing and embedding the coil 10 into the mixture of the thermosetting resin 120 and the iron powder 121 agitated within the case 11 as shown in FIG. 9.

The hardening step S13 is a step for applying heat to the agitated mixture which is embedded with the coil 10, so that the thermosetting resin 120 dispersed with the iron powder 121 is hardened. With the above steps, the reactor 1 is completed.

The first embodiment described above provides the following advantages.

In the first embodiment, each of the thermosetting resin 120 and the iron powder 121 is directly injected into the case 11 by a necessary amount. This makes it possible to suppress reactor-to-reactor variation of the mixing ratio of the iron powder 121 when the reactor 1 is mass-produced. This also makes it possible to reduce wasting the thermosetting resin 120 and the iron powder 121, to thereby improve the yield ratio. In the first embodiment, the thermosetting resin 120 and the iron powder 121 injected into the case 11 are agitated inside this case 11. Accordingly, unlike conventional methods, it is not necessary to inject an agitated mixture of the thermosetting resin 120 and the iron powder 121 into the case 11. Accordingly, the first embodiment makes it possible to shorten the working hours. Hence, according to the first embodiment, it is possible to mold the coil 10 with high efficiency while suppressing reactor-to-reactor variation of the mixing ratio of the iron powder 121 when the reactor 1 is mass-produced.

Figure 11:
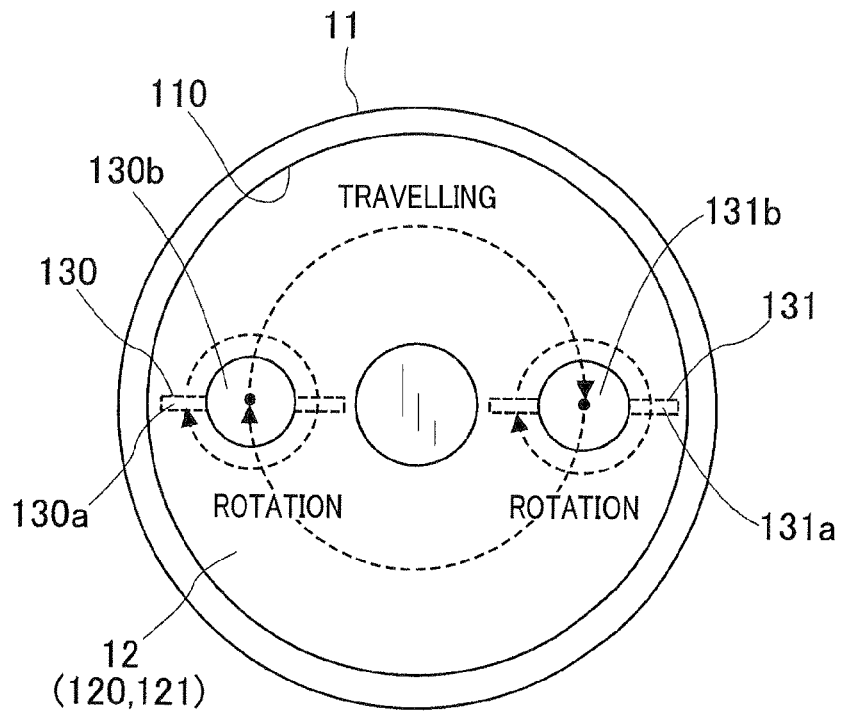
FIG. 11 is an explanatory view explaining a conventional way to move the agitating blades.
Figure 12:
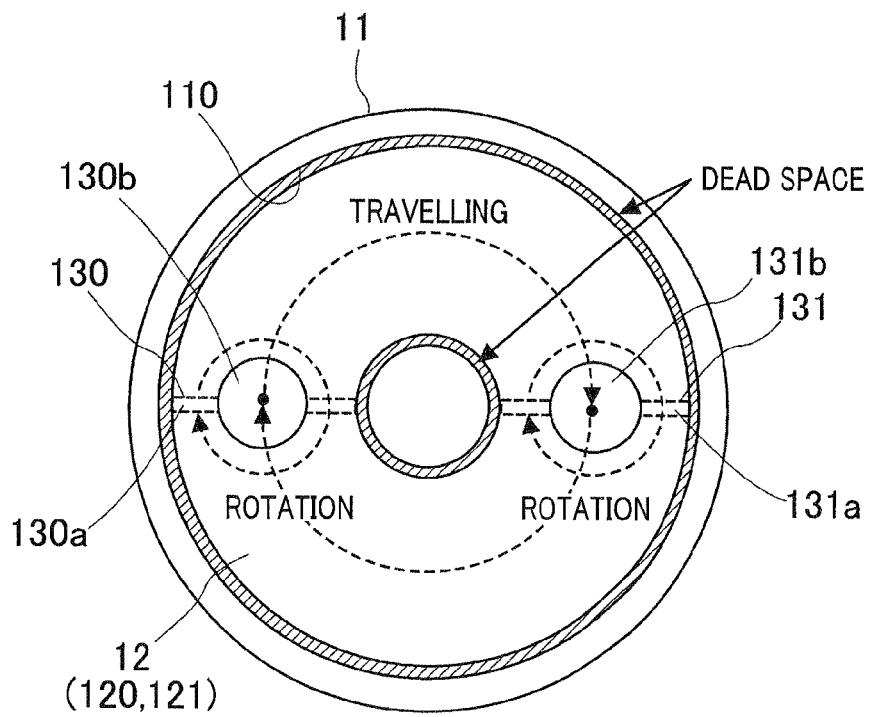
FIG. 12 is an explanatory view explaining problems in the conventional way to move the agitation blades shown in FIG. 11.

Conventionally, as shown in FIG. 11, the agitating blades 130 and 131 are traveled in only one direction along the circular path L1 while being rotated in the agitating step. According to this conventional way, it is possible to generate a laminar flow by rotating the agitating blades 130 and 131. The laminar flow enables the thermosetting resin 120 and the iron powder 121 to circulate within the case 11. However, as shown in FIG. 12, dead spaces occur at an outer side and an inner side of the groove 110 in each of which there is no flow.

In the first embodiment, since the agitating blades 130 and 131 are rotated, a laminar flow can be generated like in the above conventional method. This laminar flow enables the thermosetting resin 120 and the iron powder 121 to be agitated while being circulated within the case 11. In addition, since the agitating blades 130 and 131 are traveled along the circular path L1 while being moved forward and backward, a turbulent flow can be generated. This turbulent flow enables parts which are hard to be agitated to be sufficiently agitated. Accordingly, according to the first embodiment, the iron powder 121 can be sufficiently dispersed in the thermosetting resin 120 within the case 11.

Meanwhile, the way how the thermosetting resin 120 and the iron powder 121 circulate depend on their viscosity.

In the first embodiment, the way to move the thermosetting resin 120 and the iron powder 121 forward and backward in the agitating step S11 is changed depending on the viscosity of the mixture of thermosetting resin 120 and the iron powder 121 injected into the case 11. Accordingly, according to the first embodiment, the thermosetting resin 120 and the iron powder 121 injected into the case 11 can be efficiently circulated.

In the first embodiment, the viscosity of the mixture of the thermosetting resin 120 and the iron powder 121 is measured based on the load torque of the agitating blades 130 and 131. Accordingly, according to the first embodiment, the viscosity of the mixture of the thermosetting resin 120 and the iron powder 121 can be detected reliably during the agitating step S11.

In the first embodiment, since the case 11 housing the case 11 is used also as a molding die, it is not necessary to prepare a molding die separately, and it is not also necessary to remove the molded coil 10 from the molding die. Accordingly, according to the first embodiment, the working hours can be shortened.

In the first embodiment, the coil 10 is insert-molded in the mixture of the thermosetting resin 120 and the iron powder 121 under the condition that the iron powder 121 is sufficiently dispersed in the thermosetting resin 120. Therefore, according to the first embodiment, it is possible to manufacture reactors with sufficiently small reactor-to-reactor variation in magnetic characteristics.

Figure 13:
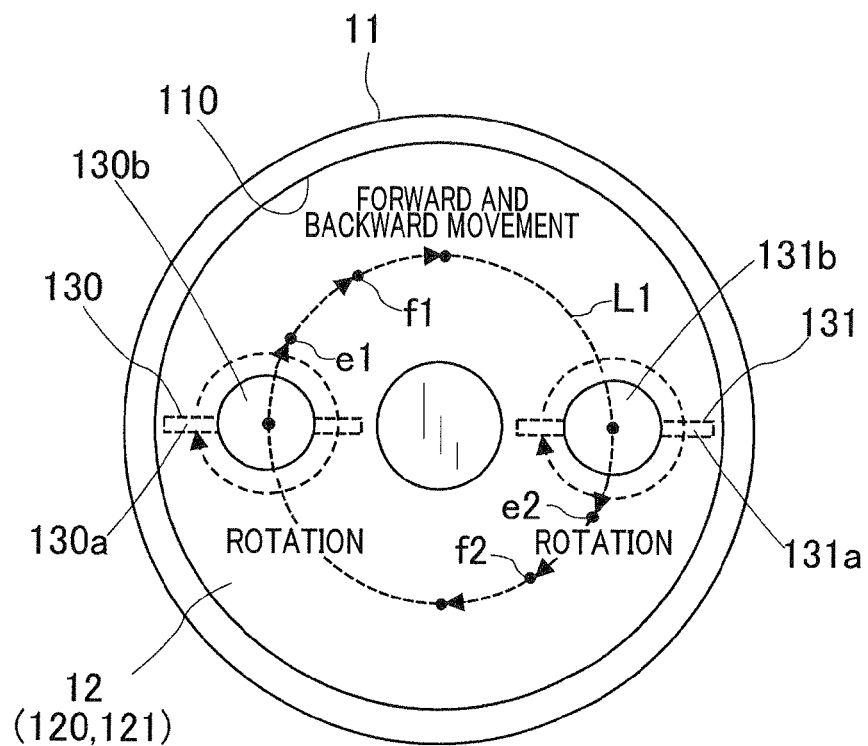
FIG. 13 is an explanatory view explaining another way to move the agitating blades in the agitating step.

Incidentally, the first embodiment may be modified such that the agitating blades 130 and 131 are traveled along the circular path L1 while being moved forward and stopped as shown in FIG. 13 instead of being moved forward and backward. In this modification, the agitating blade 130 is moved forward to reach a point e1 and then stopped for a predetermined time, while the agitating blade 131 is moved forward to reach a point e2 and then stopped for the predetermined time. Thereafter, the agitating blade 130 is moved forward to reach a point f1 and then stopped for the predetermined time, while the agitating blade 131 is moved forward to reach a point f2 and then stopped for the predetermined time. The above movements are repeated.

In this modification, the way to move the agitating blades 130 and 131 may be changed depending on the viscosity of the mixture of the thermosetting resin 120 and the iron powder 121 injected into the case 11. For example, the stroke of the forward movement or the stop period may be changed depending on the viscosity of the viscosity.

Figure 14:
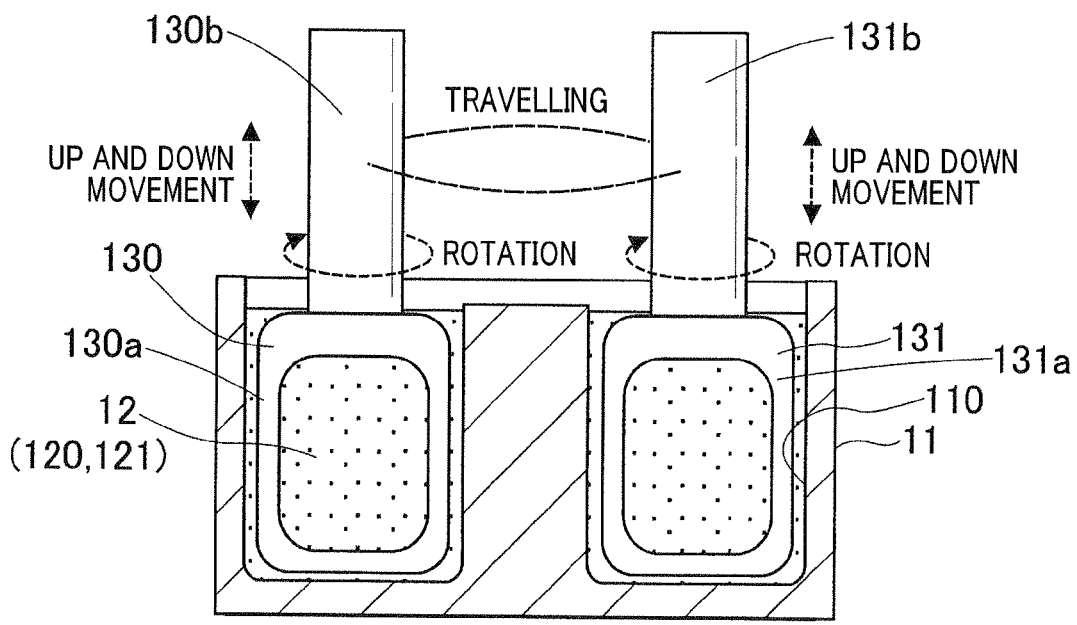
FIG. 14 is an explanatory view explaining modification of the agitating step.

As shown in FIG. 14, the agitating blades 130 and 131 may be moved up and down inside the case 11. This enables sufficiently circulating the thermosetting resin 120 and the iron powder 121 within the case 11, and accordingly enables sufficiently dispersing the iron powder 121 in the thermosetting resin 120. At this time, the way to move up and down the agitating blades 130 and 131 may be changed depending on the viscosity of the mixture of thermosetting resin 120 and the iron powder 121 injected into the case 11. For example, the stroke of the upward and downward movements may be changed depending on the viscosity. This makes it possible to efficiently circulate the thermosetting resin 120 and the iron powder 121 within the case 11.

Figure 15:
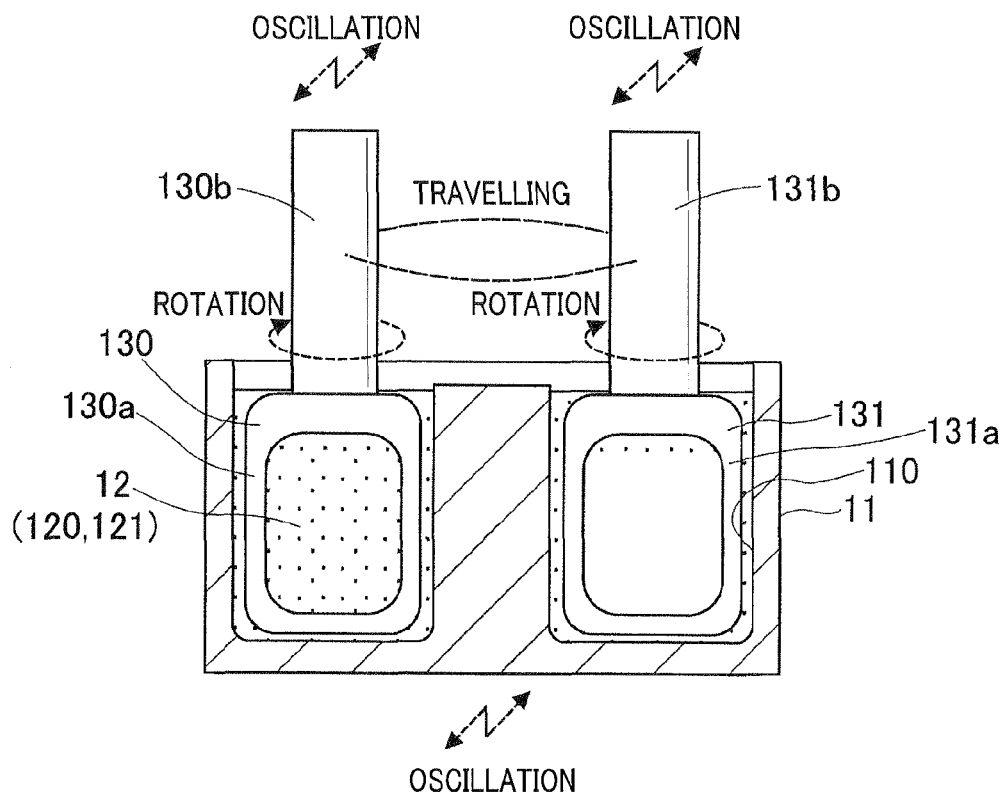
FIG. 15 is an explanatory view explaining still another modification of the agitating step.
Figure 16:
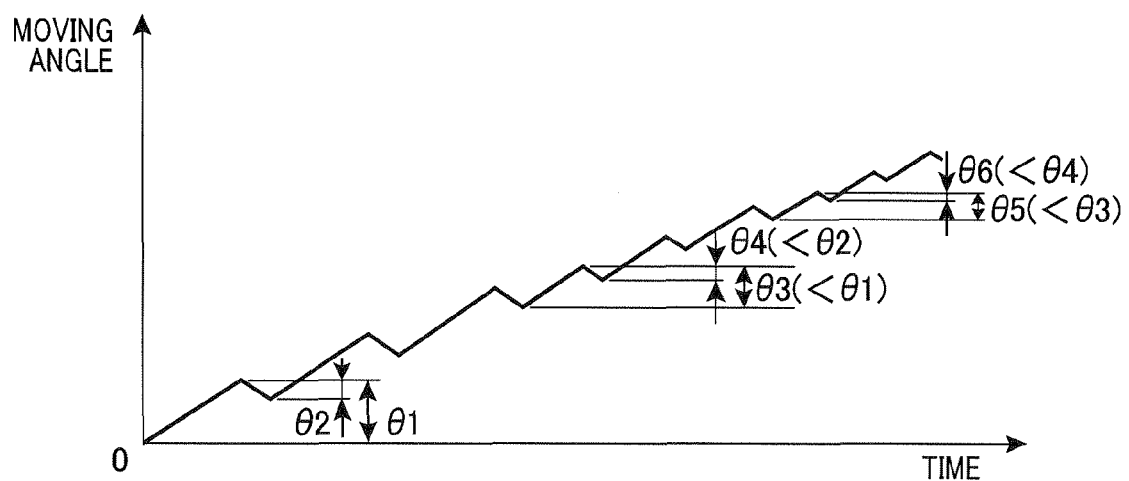
FIG. 16 is a graph explaining a way to move the agitating blades in the modification of the agitating step.

As shown in FIG. 15, at least one of the case 11 and the agitating blades 130 and 131 may be osculated in a voluntary direction. By oscillating at least one of the case 11 and the agitating blades 130 and 131, the thermosetting resin 120 and the iron powder 121 can be further sufficiently circulated within the case 11, and accordingly the iron powder 121 can be further sufficiently dispersed in the thermosetting resin 120 within the case 11. At this time, the way to oscillate the case 11 or the agitating blades 130 and 131 may be changed depending on the viscosity of the mixture of the thermosetting resin 120 and the iron powder 121 injected into the case 11. For example, the stroke or frequency of the upward and downward movements may be changed depending on the viscosity. This makes it possible to efficiently circulate the thermosetting resin 120 and the iron powder 121 within the case 11.

In the first embodiment, the angles $\theta 1$ and $\theta 2$ by which the agitating blades 130 and 131 are moved forward and backward, respectively are constant. However, the angles $\theta 1$ and $\theta 2$ may be gradually decreased with time. Further, the angles $\theta 1$ and $\theta 2$ may be decreased with decrease of the viscosity of the thermosetting resin 120 mixed with the iron powder 121.

In the first embodiment, the coil 10 is insert-molded in the thermosetting resin 120 mixed with the iron powder 121. However, the thermosetting resin 120 may be mixed with magnetic powder other than iron powder. The thermosetting resin 120 may be mixed with solid powder other than magnetic powder.

In the first embodiment, the case 11 has a columnar shape formed with the circular groove 110. However, the case 11 may be shaped into a bottomed cylinder. Further, the case 11 may not be formed with the columnar projection at its center.

In the first embodiment, instead of the thermosetting resin 120 hardened by being applied with heat in the hardening step S13, a cold-setting resin may be used.

Second Embodiment

Next, a second embodiment of the invention is described.

Figure 17:
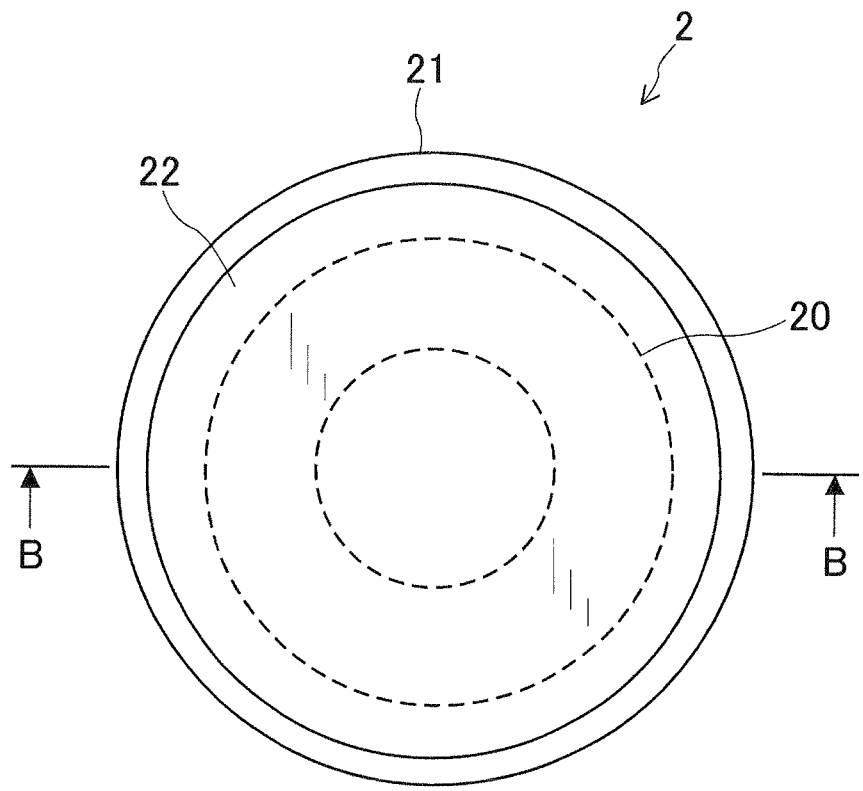
FIG. 17 is a top view of a reactor manufactured by a method according a second embodiment of the invention.
Figure 17:
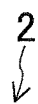
Figure 18:
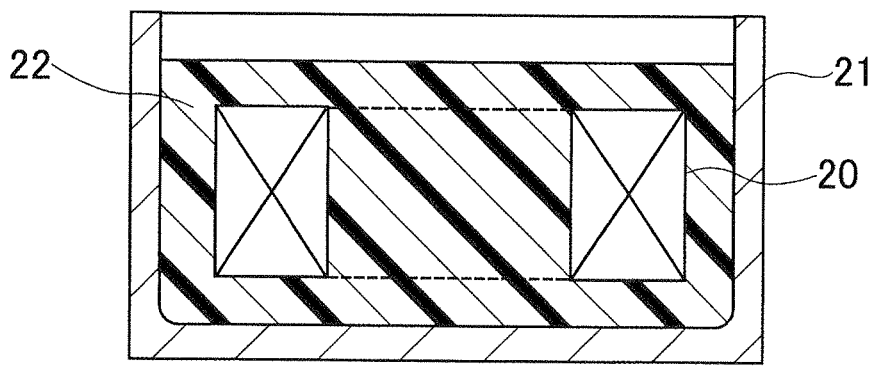
FIG. 18 is a cross-sectional view of FIG. 17 taken along line B-B.

First, the structure of a reactor 2 manufactured by the method according to the second embodiment of the invention is explained with reference to FIGS. 17 and 18. FIG. 17 is a top view of the reactor 2. FIG. 18 is a cross-sectional view of FIG. 8 taken along line B-B. In FIGS. 17 and 18, terminals of a coil 20 of the reactor 2 are omitted from illustration.

The reactor 2 as a molded article includes the coil 20 and a case 21. The structure of the coil 20 is the same as that of the coil 10 described in the first embodiment. The case 21, which is made of aluminum, is a member for housing the coil 20. Unlike the case 11 of the first embodiment, the case 21 has a shape of a bottomed cylinder not formed with a columnar projection at its center. The coil 20 accommodated in the case 21 is insert-molded in a thermosetting resin 220 mixed with iron powder 221. The case 21 is fixed integrally to the coil 20 through the thermosetting resin 220 mixed with the iron powder 221.

Figure 19:
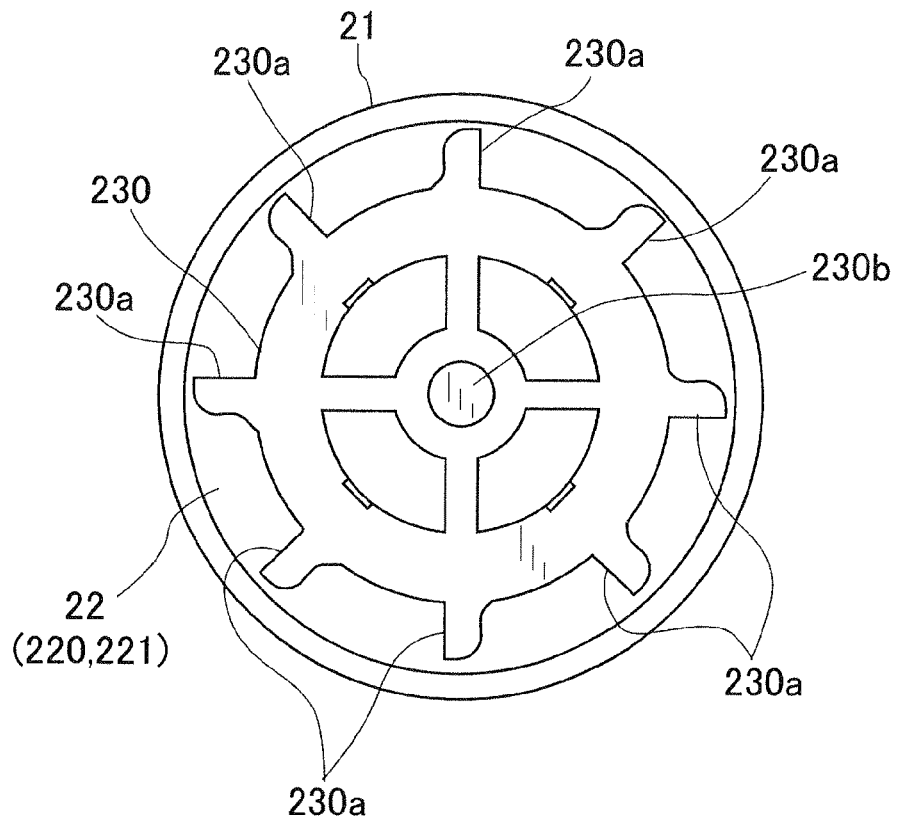
FIG. 19 is an explanatory view explaining an agitating step included in the method according the second embodiment.
Figure 20:
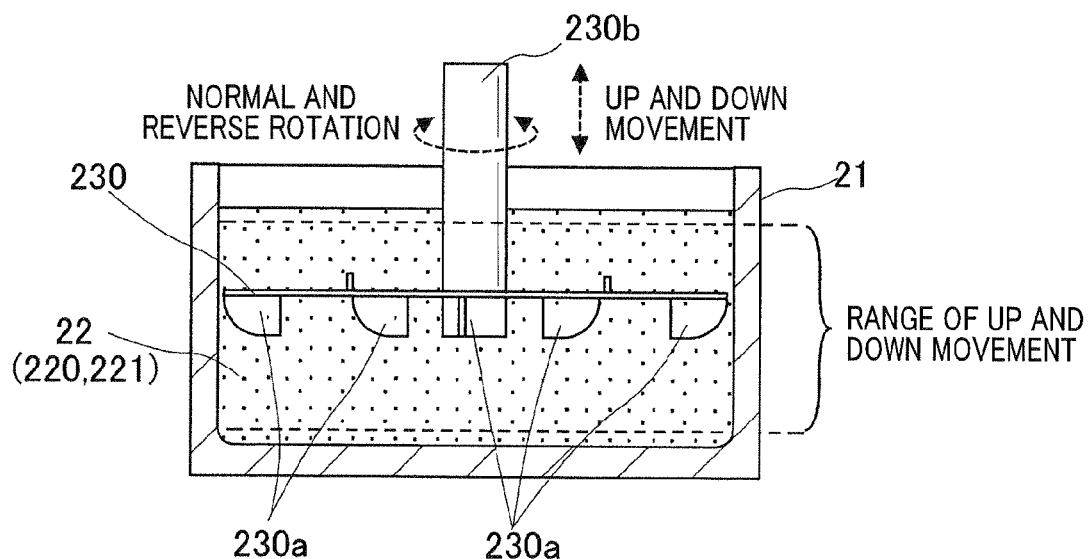
FIG. 20 is another explanatory view explaining the agitating step included in the method according the second embodiment.
Figure 21:
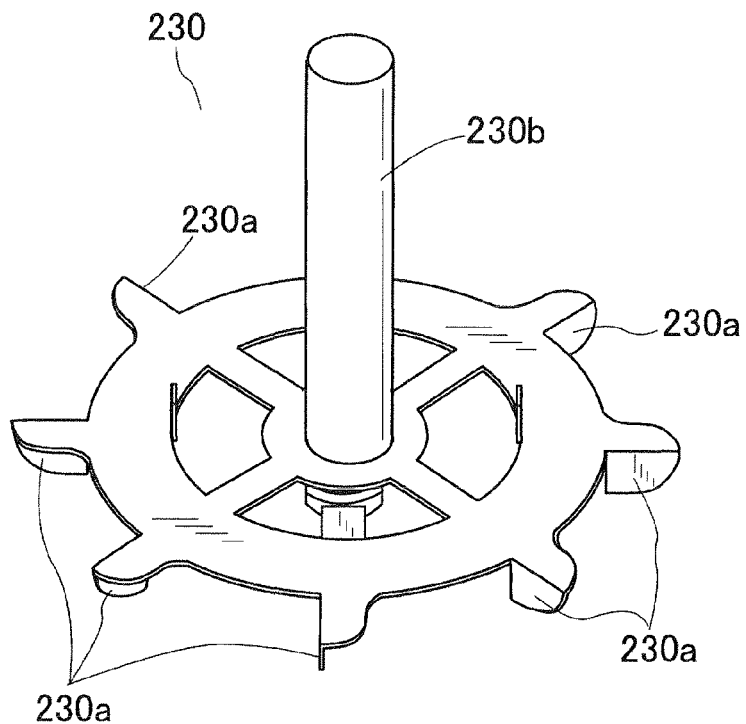
FIG. 21 is a perspective view of agitating blades (diagrammatic perspective view of FIGS. 19 and 20) used for carrying out the agitating step included in the method according the second embodiment.
Figure 22:
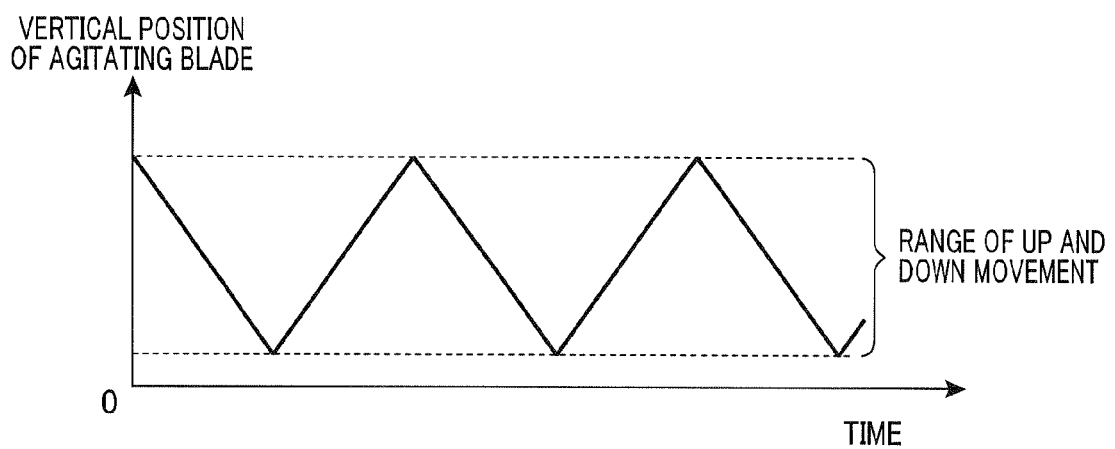
FIG. 22 is a graph explaining a way to move up and down an agitating blade used for carrying out the agitating step included in the method according the second embodiment.

Next, a method of manufacturing the reactor 2 is explained. The method of the second embodiment is the same as the method of the first embodiment except for the agitating step. Accordingly, in the following, only the agitating step is described with reference to FIGS. 19 to 22, and the other steps are omitted from description. FIG. 19 is an explanatory view explaining the agitating step included in the method according the second embodiment. FIG. 20 is another explanatory view explaining the agitating step included in the method according the second embodiment. FIG. 21 is a perspective view of an agitating blade 230 used for carrying out the agitating step. FIG. 22 is a graph explaining a way to move up and down the agitating blade 230 used for carrying out the agitating step.

The agitating step is a step for agitating the thermosetting resin 220 and the iron powder 221 within the case 11 so that the iron powder 221 is dispersed in the thermosetting resin 220 as a molding material. More specifically, the single agitating blade 230 is disposed inside the case 21 into which the thermosetting resin 220 and the iron powder 221 have been injected as shown in FIGS. 19 and 20. As shown in FIG. 21, the agitating blade 230 is constituted of a blade section 230a and a shaft section 230b. The blade section 230a is formed by bending the outer periphery of a metal plate having a nearly circular shape fixed to the shaft section 230b.

As shown in FIG. 20, the agitating blade 230 is rotated normally and reversely repeatedly. Further, the agitating blade 230 is moved up and down repeatedly. More specifically, the agitating blade 230 is moved up and down repeatedly within a certain up-down range set with respect to the direction of depth of the thermosetting resin 220 mixed with the iron powder 221. In this embodiment, as shown in FIG. 22, the blade section 230a of the agitating blade 230 is moved up and down repeatedly within the up-down range linearly with time. That is, the blade section 230a of the agitating blade 230 is moved up and down at a constant speed. During this agitating step, the viscosity of the mixture of the thermosetting resin 220 and the iron powder 221 is measured based on the load torque of the agitating blade 230. The way to change the rotational direction of the agitating blade 230 is changed depending on the measured viscosity. More specifically, the ratio between the amount or time period of the normal rotation and that of the reverse rotation is changed depending on the measured viscosity. This makes it possible to sufficiently agitate the mixture of the thermosetting resin 220 and the iron powder 221 to thereby disperse the iron powder 221 in the thermosetting resin 220.

The second embodiment described above provides the following advantages.

In the second embodiment, since the agitating blade 230 is rotated, a laminar flow can be generated. This laminar flow enables the thermosetting resin 220 and the iron powder 221 to be agitated while being circulated within the case 21. In addition, since the normal rotation and reverse rotation of the agitating blade 230 are repeated, a turbulent flow can be generated. This turbulent flow enables parts which are hard to be agitated to be sufficiently agitated. Accordingly, according to the second embodiment, the iron powder 221 can be sufficiently dispersed in the thermosetting resin 120 within the case 21.

In the second embodiment, the way to change the rotational direction of the agitating blade 230 is changed depending on the viscosity of the mixture of the thermosetting resin 220 and the iron powder 221. This makes it possible to efficiently circulate the thermosetting resin 220 and the iron powder 221 within the case 21.

In the second embodiment, the agitating blade 230 is rotated such that the blade section 230a repeats normal rotation and reverse rotation. However, the agitating blade 230 may be rotated such that the blade section 230a repeats sequences involving rotation and stopping. In this case, the way for the blade section 230a to repeat normal rotation and stop may be changed depending on the viscosity of the mixture of the thermosetting resin 220 and the iron powder 221 injected into the case 21. For example, the ratio between the time period of rotation and the time period of stop may be changed depending on the measured viscosity. Further, at least one of the case 21 and the agitating blade 230 may be oscillated.

Figure 23:
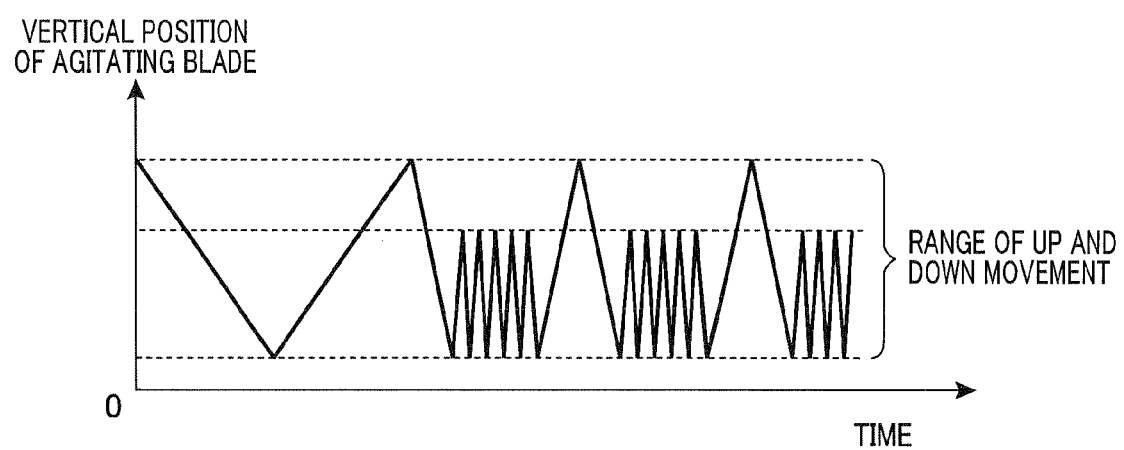
FIG. 23 is a graph explaining a way to move up and down the agitation blade used for carrying out a modification of the agitating step included in the method according the second embodiment.

In the second embodiment, the agitating blade 230 is moved up and down at a constant speed. However, the speed of the agitating blade 230 in the up-down direction may be changed with time as shown in FIG. 23. For example, the speed of the agitating blade 230 in the up-down direction may be low initially, and increased when the degree of agitation has reached some level. In this case, the speed of the up-down movement may be changed depending on the load torque of the agitating blade 230. Since the degree of agitation progresses with time, the load torque of the agitating blade 230 becomes smaller with time. Accordingly, it is possible to shorten the agitating step by increasing the speed of the up-down movement with time. It is preferable to reduce the stroke of upward movement of the agitating blade 230 when the speed of the up-down movement is increased. That is because this makes it possible to efficiently circulate the thermosetting resin 220 and the iron powder 221 while preventing the thermosetting resin 220 and the iron powder 221 from overflowing from the case 21.

In the second embodiment, the coil 20 is insert-molded in the thermosetting resin 220 mixed with the iron powder 221. However, the thermosetting resin 220 may be mixed with magnetic powder other than iron powder. Further, the thermosetting resin 220 may be mixed with solid powder other than magnetic powder.

The case 21 of the second embodiment has a shape of an bottomed cylinder. However, the case 21 may have a columnar shape formed with a circular groove. If some modification is made to the structure of the shaft section 230a of the agitating blade 230, the case 21 can be formed with a columnar projection at its center like the case 11 of the first embodiment.

In the second embodiment, instead of the thermosetting resin 220 hardened by being applied with heat in the hardening step, a cold-setting resin may be used.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a molded article including a component insert-molded in a molding material mixed with solid powder comprising:
   an injecting step of injecting the molding material and the solid powder into a molding die;
   an agitating step of agitating the molding material and the solid powder within the molding die to disperse the solid powder in the molding material; and
   an embedding step of pressing and embedding the component into an agitated mixture of the molding material and the solid powder:
   wherein the agitating step is performed such that an agitating blade is inserted into the molding material and the solid powder injected into the molding die, the agitating blade travelling along a predetermined path within the molding die while being moved forward and backward repeatedly or being moved forward along the predetermined path and stopped repeatedly so that the solid powder is dispersed in the molding material.

2. The method of manufacturing a molded article according to claim 1, wherein a way to move forward and backward or to move forward and stop the agitating blade is changed depending on viscosity of the molding material mixed with the solid powder.

3. A method of manufacturing a molded article including a component insert-molded in a molding material mixed with solid powder comprising:
- an injecting step of injecting the molding material and the solid powder into a molding die;
- an agitating step of agitating the molding material and the solid powder within the molding die to disperse the solid powder in the molding material; and
- an embedding step of pressing and embedding the component into an agitated mixture of the molding material and the solid powder:
- wherein the agitating step is performed such that an agitating blade is inserted into the molding material and the solid powder injected into the molding die, the agitating blade travelling along a predetermined path within the molding die while being rotated normally and reversely repeatedly or being rotated normally and stopped repeatedly so that the solid powder is dispersed in the molding material.

4. The method of manufacturing a molded article according to claim 3, wherein a way to rotate normally and reversely or to rotate normally and stop the agitating blade is changed depending on viscosity of the molding material mixed with the solid powder.

5. The method of manufacturing a molded article according to claim 1, wherein the agitating blade is moved upward and downward repeatedly within the molding die during the agitating step.

6. The method of manufacturing a molded article according to claim 5, wherein a way to move up and down the agitating blade is changed depending on viscosity of the molding material mixed with the solid powder.

7. The method of manufacturing a molded article according to claim 5, wherein speed of moving up and down the agitating blade is increased with time.

8. The method of manufacturing a molded article according to claim 7, wherein a stroke of upward movement of the agitating blade is decreased with increase of the speed of moving up and down the agitating blade.

9. The method of manufacturing a molded article according to claim 1, wherein at least one of the molding die and the agitating blade is oscillated during the agitating step.

10. The method of manufacturing a molded article according to claim 9, wherein a way to oscillate the agitating blade is changed depending on viscosity of the molding material mixed with the solid powder.

11. The method of manufacturing a molded article according to claim 2, wherein the viscosity of the molding material mixed with the solid powder is measured based on load torque of the agitating blade.

12. The method of manufacturing a molded article according to claim 2, wherein the molding die is a case for housing the component.

13. The method of manufacturing a molded article according to claim 2, wherein the component is a coil.

14. The method of manufacturing a molded article according to claim 13, wherein the solid powder is magnetic powder.

15. The method of manufacturing a molded article according to claim 2, wherein the molding article is a device to be mounted on a vehicle.

16. The method of manufacturing a molded article according to claim 3, wherein the molding die is a case for housing the component.

17. The method of manufacturing a molded article according to claim 3, wherein the component is a coil.

18. The method of manufacturing a molded article according to claim 17, wherein the solid powder is magnetic powder.

19. The method of manufacturing a molded article according to claim 3, wherein the molding article is a device to be mounted on a vehicle.

* * * * *